United States Patent [19]
Tobe et al.

[11] Patent Number: 6,054,150
[45] Date of Patent: Apr. 25, 2000

[54] METHOD FOR PRODUCING SEASONING LIQUIDS

[75] Inventors: Katsutoshi Tobe; Toshinobu Sugimoto, both of Noda, Japan

[73] Assignee: Kikkoman Corporation, Noda, Japan

[21] Appl. No.: 09/138,343

[22] Filed: Aug. 21, 1998

[30] Foreign Application Priority Data

Sep. 17, 1997 [JP] Japan .................................. 9-269221

[51] Int. Cl.$^7$ ...................................................... A21D 2/00
[52] U.S. Cl. ............................... 426/20; 426/21; 426/46; 426/589; 426/634; 426/638
[58] Field of Search ................................. 426/20, 21, 46, 426/589, 634, 638

[56] References Cited

U.S. PATENT DOCUMENTS

| | | | |
|---|---|---|---|
| 3,495,991 | 2/1970 | Mogi et al. ................................ | 99/145 |
| 3,852,479 | 12/1974 | Yokotsuka et al. ....................... | 426/44 |
| 3,912,822 | 10/1975 | Yokotsuka et al. ....................... | 426/44 |
| 4,913,914 | 4/1990 | Hashimoto et al. ...................... | 426/46 |
| 5,141,757 | 8/1992 | Hoc Dac et al. ......................... | 426/46 |
| 5,652,004 | 7/1997 | Nagata et al. ............................ | 426/44 |
| 5,665,407 | 9/1997 | Nagata et al. ............................ | 426/18 |
| 5,869,115 | 2/1999 | Fukushima et al. ...................... | 426/20 |

FOREIGN PATENT DOCUMENTS

| | | |
|---|---|---|
| 0 640 294 A1 | 3/1995 | European Pat. Off. . |
| 0 711 510 A1 | 10/1995 | European Pat. Off. . |
| 7-147928 | 6/1995 | Japan . |
| 10-165137 | 6/1998 | Japan . |
| WO95/28853 | 11/1995 | WIPO . |

*Primary Examiner*—Nina Bhat
*Attorney, Agent, or Firm*—Banner & Witcoff, Ltd.

[57] ABSTRACT

Method for producing, in a short time period, a soy sauce seasoning liquid having a high nitrogen content by efficient utilization of vital gluten upon its addition to soy sauce koji and brine wherein the gluten is added to an enzymatically hydrolyzed mixture of the soy sauce koji and brine.

3 Claims, No Drawings

METHOD FOR PRODUCING SEASONING LIQUIDS

BACKGROUND OF THE INVENTION

1. Field of the Invention

The present invention relates to a method for producing seasoning liquids, more specifically to a method for readily producing seasoning liquids having a high nitrogen content in a short period of time by using vital gluten which is hardly used as a raw material of seasoning liquids.

2. Description of Related Art

Soy sauce has now been used as a world-wide seasoning not only in home cooking but also in a variety of processed foods.

In general, soy sauce is produced by inoculating seed mould in a mixture of cooked soy bean and roasted wheat, culturing the mixture to make a soy sauce koji, which is prepared together with brine in a brewing vessel, fermented and matured for a long period of 6–12 months. In the process of fermentation and maturation, the mixture is hydrolyzed with the enzymes of koji into flavor enhancing ingredients or by lacto-bacillus or yeast into organic acids such as lactic acid, various alcohols such as ethanol, and a variety of flavors, thus producing a seasoning having characteristic taste and flavor.

On the other hand, there is a method for using wheat gluten in addition to soy bean as the protein materials for preparing high nitrogen containing soy sauce or soy sauce-like seasonings.

Wheat gluten is prepared by kneading wheat powder in water to give a sticky lump, to which is added water for further kneading to rinse off soluble components such as starch.

Wheat glutens are largely classified into vital glutens such as a gluten which is a water-containing wheat protein obtained as described above (referred to hereinafter as hydrous vital gluten) and a vital gluten which is the hydrous vital gluten having been dried while avoiding the denaturation of the protein (referred to hereinafter as dry vital gluten), and devitalized glutens which are the wheat proteins obtained from the aforementioned hydrous vital gluten by denaturation treatments with heat or acid (referred to hereinafter as devitalized gluten).

While the hydrous vital gluten containing a large amount of water is deteriorated very easily and thus commercially distributed at a low temperature or in a frozen state, the dry vital gluten is in a dry powdery form and hardly deteriorated, so that they have an advantage that they can be easily stored or distributed commercially.

The dry vital gluten has a reversible physical property, which will be returned to the original physical property, that is the sticky gum form, by the addition of water. On the other hand, the devitalized gluten which is the denatured wheat protein has an irreversible physical property and is not returned to its sticky gum state even by the addition of water, so that it is easily handled on adding to food materials, but it is expensive relative to the dry vital gluten.

Among the wheat glutens, the vital gluten is used mainly for the production of processed foods such as meat products, breads and noodles, while the devitalized gluten is used as a raw material of soy sauce, amino acids and animal feeds.

The dry vital gluten has a reversible physical property as described above on its use as a raw material for foods blended with liquids and results in the increased stickiness, which causes problems inconvenient to its dispersibility, solubility, pressing ability or total nitrogen utility, so that it has hitherto been extremely difficult to use the dry vital gluten as a raw material of soy sauce or seasoning liquids. That is to say, when soy sauce koji and powdery dry vital gluten are blended with brine to make dispersion of moromi mash having the brine absorbed therein, the dry vital gluten is hardly dispersed and results in a number of spherical lumps. The lumps contain brine which is absorbed only in the surface, and form sticky gum film on the surface, so that the brine does not penetrate into the interior, which remains in the powdery form. In addition, if such lumps have been formed, it is extremely difficult to destroy the lumps with any means for blending and agitation, so that the lumps remain as such even after maturation period. The occurrence of such lumps inhibits the permeation of enzymes contained in koji, and thus the raw materials in the lump part are scarcely hydrolyzed. As a result, the ratio of the nitrogen utilized as soy sauce or seasoning to the nitrogen contained in the raw materials used (referred to hereinafter as raw material nitrogen utility) is lowered extensively. In addition, the pressing ability is also decreased extensively, the yield of soy sauce or seasoning is poor. The part of lumps into which brine is permeated only insufficiently is susceptible to the contamination by microorganisms and thus may cause inconveniences such as abnormal fermentation.

Because of such inconveniences owing to the use of vital gluten, the devitalized gluten which is a denatured wheat protein having an irreversible physical property and being easily blended and dispersed is currently employed as the gluten used as a raw material of soy sauce or seasoning liquids.

The present invention has been done for the purpose of solving the aforementioned defects in the conventional method for producing a seasoning liquid by blending and dispersing soy sauce koji and the vital gluten into brine, and providing a process for obtaining with ease a high nitrogen containing seasoning liquid excellent in total nitrogen utility within a short time by blending the vital gluten with soy sauce koji and brine and thus resulting in a dispersion.

SUMMARY OF THE INVENTION

The present inventors have studied extensively in order to solve the aforementioned problems. As a result, they have found that in a process for producing a seasoning liquid from moromi mash prepared with soy sauce koji, vital gluten and brine, the vital gluten can be dispersed into the moromi mash with substantially no production of spherical lumps by first blending soy sauce koji and brine, hydrolyzing enzymatically the mixture to lower the viscosity, then adding the vital gluten to the hydrolyzed mixture with agitation. They have also found that according to the process the raw material nitrogen utility in the seasoning liquid thus obtained is improved, and the pressing ability of the moromi mash is more excellent as compared with the method in which soy sauce koji and vital gluten are blended with brine at the same time.

That is to say, the present invention is a process for producing a seasoning liquid by blending soy sauce koji, gluten and brine to give moromi mash, which is pressed after maturing for a certain period of time, characterized in that when soy sauce koji, gluten and brine are blended to make moromi mash, soy sauce koji and brine are first blended, the mixture is hydrolyzed enzymatically to lower the viscosity of the mixture, and then vital gluten is added to the hydrolyzed mixture, which is stirred to form a dispersion.

DETAILED DESCRIPTION OF THE INVENTION

The present invention is now specifically described below.

The soy sauce koji used in the present invention is not limited, and any soy sauce koji products prepared in the conventional method may be used, for example, the one which is prepared by blending soy bean heat-denatured in the well-known method and wheat heat-denatured and grounded into a proper particle size in an appropriate ratio, for example 80:20—20:80, inoculating a seed mould such as *Aspergillus oryzae* or *Aspergillus sojae* in the mixture and then culturing the mixture under the usual condition, e.g. under the aerobic condition at 20–40° C. for 30–96 hours.

As the vital gluten used in the present invention, there is used the hydrous vital gluten or the dry vital gluten described above. The present invention can be particularly suitably applied to the use of the dry vital gluten which becomes sticky and hardly dispersed in the preparation of the moromi mash by blending soy sauce koji, gluten and brine. In addition, the aforementioned dry vital gluten is commercially available in the forms of powder or flakes, either of which forms can be used in the present invention, the flakes being preferably used in the form of powder with use of grinder.

In this connection, the present process can be also applied to the case that the devitalized gluten which is the denatured wheat protein is used.

Also, the brine used in the present invention is not specifically limited to its concentration or amount and can be selected to ensure that the intended seasoning liquid has a desired NaCl concentration for example in the range of 1–30% w/v, preferably 10–28% w/v. It is also possible to add water in addition to the brine, if necessary.

For the practice of the present invention, soy sauce koji and brine are first blended. At this time, water may be added in an appropriate amount in addition to the brine, if necessary. The aforementioned blending method may be any method by which soy sauce koji and brine are satisfactorily blended. There can be used the methods usually used in the production of soy sauce, for example, the method in which soy sauce koji and brine are simultaneously and continuously supplied to a blender-conveyor comprising a U-type tube provided with a ribbon screw and the mixture is filled in a vessel for enzymatic hydrolysis, or the method in which soy sauce koji added to the brine in a vessel for enzymatic hydrolysis, air is blown into the mixture for agitation and blending. The mixture is then enzymatically hydrolyzed with enzymes contained in the koji to lower the viscosity of the mixture. The enzymatic hydrolysis is carried out under the condition to ensure the viscosity of the mixture to be decreased, for example at a temperature of 20–50° C., preferably at 25–45° C. for 10–250 hours, preferably 20–200 hours to decrease the viscosity of the mixture preferably to 3,000 cp or less, more preferably 2,500 cp or less measured with a B-type viscosity meter. If the viscosity of the mixture exceeds 3,000 cp, the vital gluten to be added is hardly dispersed, and the object of the present invention cannot be accomplished sufficiently. If the hydrolysis temperature is less than 20° C., a long period of hydrolysis is required; while if the temperature exceeds 50° C. and the hydrolysis exceeds 250 hours, the hydrolyzed mixture has a heated flavor, which impair the flavor of the seasoning liquid, and the brown coloration progresses to such an extent that the chromaticity of the seasoning liquid grows darkened excessively. On the other hand, if the hydrolysis time is less than 10 hours, the hydrolysis is performed only insufficiently with the enzymes, and the viscosity of the mixture is not lowered sufficiently to such extent described as above.

That is to say, it is essential first to blend the soy sauce koji with the brine and to carry out enzymatic hydrolysis for lowering the viscosity of the mixture. Thus it is possible to disperse homogeneously the vital gluten, which is added as described below, without lumps in the hydrolyzed mixture.

Next, the vital gluten is added to the hydrolyzed mixture thus prepared for blending, dispersion and dissolution to form the moromi mash. The amount of the vital gluten added in the present invention is not specifically limited. It is optionally selected owing to the desired nitrogen concentration of the seasoning liquid, and the vital gluten can be employed for example in a weight ratio of 0.05–2.5 on the basis of the soy sauce koji. At the time, it is essential to carry out the addition and blending of the vital gluten gradually under the condition that the vital gluten will not produce spherical lumps, for example at the viscosity of the moromi mash in the range of 3,000 cp or less, preferably 2,500 cp or less. If the viscosity of the moromi mash at the blending exceeds 3,000 cp, the dry vital gluten added becomes hardly dispersed and forms small spherical lumps due to the viscous moromi mash, and the object of the present invention cannot be accomplished satisfactorily.

The method for blending and dispersing the dry vital gluten into the aforementioned hydrolyzed mixture is not specifically limited, and any agitation and blending methods which can blend the hydrolyzed mixture and the dry vital gluten homogeneously can be applied in the present invention. For instance, there are used a vertical stirrer having one or more propellers provided on the vertical agitation axis at the center of a vessel in which the hydrolyzed mixture is contained, a lateral type propeller stirrer provided on the side of the vessel, or an aeration-agitation with compressed air.

By such operations, the vital gluten added is easily dispersed into the hydrolyzed mixture to form the moromi mash without forming lumps.

The moromi mash prepared as described above according to the present invention is hydrolyzed and matured in the same manner as in the production of soy sauce by the conventional method such as the one at a temperature of 25–45° C. for 3 days–6 months. It is also possible, if necessary, to ferment and mature the moromi mash to which the vital gluten has been added or not by adding an appropriate amount of lactic acid bacteria for soy sauce such as *Pediococcus halophilus* or yeast for soy sauce such as *Zygosaccharomyces rouxii*.

In the moromi mash obtained by the present process, the vital gluten is in the form of dispersion and contains no lumps, and thus the moromi mash is hydrolyzed and dissolved satisfactorily by the action of enzymes. Thus, it is possible according to the present invention to obtain a moromi mash which contains a high nitrogen containing seasoning liquid in a short fermentation period of 7 days–6 months in which the raw material nitrogen utility has been improved due to the effective dissolution of nitrogen derived from the added active gluten as compared with the conventional method of simultaneously adding vital gluten and koji.

The matured moromi mash is pressed according to the conventional method to separate and collect the seasoning liquid. The moromi mash prepared and matured according to the present process contains no lumps as described above, has an improved dissolution of raw material nitrogen due to the increase of the solubility of the vital gluten as well as an easier separation of solid and liquid at the time of pressing, and pressing ability is also improved as compared with the conventional method.

The seasoning liquid thus collected can be sterilized to give a final product. In addition, it is possible to add appropriately seasonings and flavoring agents to the seasoning liquid described above, if necessary.

EXAMPLES

The present invention is described more particularly with reference to examples without limitation thereto.

In this connection, the analysis of the ingredients of respective seasoning liquids in the following examples was performed in accordance with "SHOYU SHIKEN-HO," Edited by JAPAN SOY SAUCE RESEARCH INSTITUTE (Mar. 1, 1985).

Example 1

To 2.6 kg (total nitrogen, 8.0% w/w) of defatted soybean was added about 1.5 times of water, and soybean cooked in the usual manner and 2.6 kg of wheat (total nitrogen, 2.5% w/w) having been roasted and crushed were mixed to make a koji mash. Then a seed mould (*Aspergillus sojae* ATCC 42250) was inoculated in $3 \times 10^4$ cell/1 g of koji mash, and the koji mash is cultured under aeration for 72 hours in the usual manner to obtain 6.4 kg of soy sauce koji.

In the first step, a mixture of 6.4 kg of the aforementioned soy sauce koji and 14 liters of brine having a concentration of 16% w/v (2.24 kg as a NaCl amount) agitated and blended with a paddle at a temperature of 40° C. was received in an about 40 liter volume vessel (diameter of 35 cm×height of 41 cm) which was equipped with a vertical stirrer provided with propeller blades in the central part (6 propeller blades and blade length of 5 cm). The stirrer was driven at rotation speed of 300 rpm while supplying air of about 0.05 vvm (about 1.1 liter/min) from the bottom of the vessel to enzymatically hydrolyze the mixture at a temperature of 40° C. for 30 hours to give a hydrolyzed mixture having a viscosity of 1,260 cp.

In this connection, the viscosity of the hydrolyzed mixture was measured with a B-type viscosity (BL-50 type, TOKIMEC, INC.).

In the second step, while operating the stirrer and supplying air in the same manner as above, 4.4 kg of the powdery vital gluten (AMYLUM CO., trade name "AMYGLUTEN") having total nitrogen content of 13% w/w was added portionwise at a temperature of 40° C. over 72 hours so that the viscosity of the moromi mash was maintained at a level of 2,500 cp or less, and the mixture was mixed by stirring to give a moromi mash in which the powdery vital gluten is dispersed homogeneously.

In addition, during the dispersing operation described above, the culture of soy sauce yeast (*Zygosaccharomyces rouxii* ATCC 2623) which had been preliminarily cultured was added to the moromi mash in an amount of 2 ml per liter of moromi mash.

The moromi mash having the vital gluten dispersed therein was fermented and matured at 40° C. for 120 hours to give 21.8 liters of matured moromi mash.

For comparison, a matured moromi mash for comparison was also obtained in an amount of 21.8 liters by mixing, dispersion, enzymatic hydrolysis, fermentation, and maturation in the same manner as in the procedure of the present invention except that soy sauce koji and vital gluten were simultaneously added to brine in the first step in place of the addition of the vital gluten in the second step. A portion of the liquid from the matured moromi mash after 10 days including the first step was removed for analysis. The results are shown in Table 1.

In this connection, the total raw material nitrogen content derived from soybean, wheat and vital gluten in the moromi mash was 0.845 kg calculated from each of the nitrogen contents.

TABLE 1

|  | NaCl (% w/v) | Total Nitrogen (% w/v) | Glutamic Acid (% w/v) | Glutamic acid/Total nitrogen | Alcohol (% v/v) | Total Nitrogen Utility Rate (%) |
|---|---|---|---|---|---|---|
| The present invention | 11.9 | 3.67 | 2.75 | 0.75 | 2.45 | 81.8 |
| Comparison | 12.2 | 2.98 | 2.02 | 0.68 | 1.50 | 64.8 |

Next, salt was added to each of the matured moromi mash to adjust the NaCl concentration in the moromi mash to 20% w/v. The moromi mash was charged in nylon filtration bags for pressing in an amount of about 2 liters per each bag. Within a stainless steel box (length 20 cm, width 20 cm, height 30 cm), five piled bags were pressed at a pressure of 6 kg/cm$^2$ for one day. This procedure was repeated twice to press the total amount of the matured moromi mash to obtain the seasoning liquid of the present invention (16.7 liters). In the same manner the moromi mash for comparison was pressed to obtain the seasoning liquid for comparison (11.7 liters).

It is found that the value obtained from the amount of the pressed seasoning liquid (liters)/amount of the moromi mash (liters) is 76.6% in the present invention thus indicating the excellent pressing ability, while the value is 53.7% in the comparative sample thus indicating the inferior pressing ability.

The seasoning liquid was sterilized by heating at 125° C. for 5 seconds in a plate type heat exchanger, cooled to 55° C., and maintained at the temperature for 3 days to remove the sediments to give the cleared seasoning liquid according to the present invention (15.0 liters). In the same manner, the comparative seasoning (10.3 liters) was obtained. Analytical results of the cleared seasoning liquids are shown in Table 2.

TABLE 2

|  | NaCl (% w/v) | Total Nitrogen (% w/v) | Glutamic Acid (% w/v) | Glutamic acid/Total nitrogen | R.S (% w/v) | Alcohol (% v/v) | pH | Col. |
|---|---|---|---|---|---|---|---|---|
| The present invention | 19.8 | 3.62 | 2.75 | 0.76 | 2.45 | 2.40 | 5.10 | 17 |
| Comparison | 19.9 | 2.95 | 2.01 | 0.68 | 5.55 | 1.30 | 5.23 | 16 |

It is found from Tables 1 and 2 that the moromi mash liquid obtained by the process of the present invention is apparently superior over the liquid for comparison in either of the total nitrogen (T.N) concentration (% w/v), the ratio of the amount of the total nitrogen dissolved in the moromi mash liquid to the amount of the raw material total nitrogen, i.e. raw material nitrogen utility rate (T.N.U.R, %), the concentration of glutamic acid (Glu.) and Glu/T.N. It is also found from these results that a preferably fermented high nitrogen containing seasoning liquid can be obtained in short period according to the present invention. Furthermore, it is found that the present invention is more preferred in the formation of ethanol and has an improved ethanol fermentation.

It was also observed that in the procedure of the addition, mixing and dispersion of the vital gluten, while the present invention has the vital gluten dispersed effectively in the moromi mash, the comparison has a many lumps of vital gluten in the moromi mash, and small spherical lumps remain unhydrolyzed enzymatically even after maturation.

Example 2

The soy sauce koji (6.4 kg) obtained in the same manner as in Example 1 and 14 liters of 21% w/v brine (2.94 kg as NaCl) were mixed by agitation through a ribbon screw type blender-conveyor, and the mixture was charged in an about 40 liter volume vessel (diameter of 35 cm×height of 41 cm) which was equipped with a vertical stirrer provided with propeller blades in the central part (6 propeller blades and blade length of 5 cm). The stirrer was driven at rotation speed of 300 rpm to enzymatically hydrolyze the mixture at a temperature of 30° C. for 72 hours to give a hydrolyzed mixture of the first step. The hydrolyzed mixture in this time had a viscosity of 1,280 cp by a B type viscosity meter. In this connection, in the blending of the soy sauce koji and brine, a culture of lactic acid bacteria for soy sauce (*Pediococcus halophilus* ATCC 13624) which had been preliminarily cultured was added in an amount of 1 ml per liter of hydrolyzed mixture.

Next, in the second step, while rotating the stirrer in the same manner as described above, 4.4 kg of a powdery vital gluten (total nitrogen, 13% w/w; AMYLUM CO.; trade name "AMYGLUTEN" was added, blended and dispersed into the hydrolyzed mixture in the above-described vessel at a temperature of 30° C. over a period of 72 hours so that the viscosity of the moromi mash was maintained at a level of 2,000 cp or less to obtain the moromi mash.

For comparison, the moromi mash for comparison was obtained by mixing, dispersion, addition of lactic acid bacteria, and enzymatic hydrolysis in the same manner as in the procedure of the present invention except that soy sauce koji and vital gluten were simultaneously added to brine in the first step in place of the addition of the vital gluten in the second step.

In this connection, the amount of raw material total nitrogen derived from soybean, wheat and vital gluten in the moromi mash was 0.845 kg.

Next, the culture of soy sauce yeast (*Zygosaccharomyces rouxii* ATCC 2623) which had been preliminarily cultured was added to the moromi mash in an amount of 2 ml per liter of the moromi mash. The moromi mash was fermented and matured at a temperature of 30° C. for 40 days, and after 46 days including the first step, the matured moromi mash of the present invention and for comparison were obtained in an amount of 21.8 liters and 21.8 liters, respectively.

A portion of the liquid from the matured moromi mash was removed from the vessel for analysis. The results are shown in Table 3.

TABLE 3

|  | NaCl (% w/v) | Total Nitrogen (% w/v) | Glutamic Acid (% w/v) | Glutamic acid/Total nitrogen | Alcohol (% v/v) | Total Nitrogen Utility Rate (%) |
|---|---|---|---|---|---|---|
| The present invention | 15.9 | 3.68 | 2.36 | 0.64 | 2.84 | 80.5 |
| Comparison | 16.1 | 2.88 | 1.76 | 0.61 | 1.56 | 62.2 |

The matured moromi mash products were pressed in the same manner as in Example 1. As a result, the seasoning liquids in the present invention and for comparison were obtained in an amount of 16.8 liters and 13.0 liters, respectively. These results suggest that the value obtained from the amount of the pressed seasoning liquid (liters)/amount of the moromi mash (liters) is 77.1% in the present invention, while the value is 59.6% in the comparative sample, and thus the moromi mash prepared according to the present invention has a more superior pressing ability than the comparative moromi mash.

The seasoning liquid was sterilized by heating in the same manner as in Example 1, cooled and maintained at a temperature of 55° C. for 3 days to remove the sediments to give the cleared seasoning liquid according to the present invention (15.1 liters). In the same manner, the comparative seasoning liquid (11.7 liters) was obtained. Analytical results of the cleared seasoning liquids are shown in Table 4.

TABLE 4

|  | NaCl (% w/v) | Total Nitrogen (% w/v) | Glutamic Acid (% w/v) | Glutamic acid/Total nitrogen | R.S (% w/v) | Alcohol (% v/v) | pH | Col. |
|---|---|---|---|---|---|---|---|---|
| The present invention | 15.8 | 3.66 | 2.34 | 0.64 | 2.12 | 2.80 | 4.85 | 12 |
| Comparison | 16.1 | 2.83 | 1.73 | 0.61 | 5.31 | 1.52 | 4.81 | 14 |

The results of Tables 3 and 4 suggest that the moromi mash liquid prepared according to the process of the present invention is apparently superior over the liquid for comparison in either of the concentration of total nitrogen (T.N), the ratio of the amount of the total nitrogen dissolved in the moromi mash liquid to the amount of the raw material total nitrogen, i.e. nitrogen utility rate (T.N.U.R, %), the concentration of glutamic acid (Glu.) and Glu/T.N. It is also found from these results that a preferably fermented high nitrogen containing seasoning liquid which is also excellent in the production amount of ethanol can be obtained in short period according to the present invention.

It was also observed that in the procedure of the addition, mixing and dispersion of the vital gluten described above, while the present invention has the vital gluten dispersed preferably in the moromi mash, the comparison has a many lumps of vital gluten in the moromi mash, and small spherical lumps remain unhydrolyzed enzymatically even after maturation.

According to the present invention, it is possible to mix and disperse effectively the vital gluten which is more difficult to be mixed, dispersed and thus used as compared with devitalized gluten, in a convenient method without formation of gluten lumps. As a result, it is possible to prepare an improved fermented seasoning which has a preferred raw material nitrogen utility rate and a high nitrogen content in a short period of 10 days–6 months. According to the present invention, it is also possible to collect a seasoning liquid by effectively pressing a moromi mash having an excellent pressing ability.

What is claimed is:

1. In a process for preparing a seasoning liquid by blending soy sauce koji, gluten and brine to give a moromi mash, which mash is pressed after maturation for a certain period of time to produce the seasoning liquid, the improvement which comprises first blending soy sauce koji and brine, enzymatically hydrolyzing the mixture of soy sauce koji and brine to lower the viscosity of the mixture to 3,000 cp or less, then adding, blending and dispersing vital gluten into the hydrolyzed mixture to form a moromi mash dispersion, and maintaining the viscosity of the moromi mash dispersion at a level of 3,000 cp or less.

2. A process according to claim 1, wherein the viscosity of the mixture of soy sauce koji and brine is lowered to 2,500 cp or less and wherein the viscosity of the moromi mash dispersion is maintained at a level of 2,500 cp or less.

3. A process according to claim 1, wherein said vital gluten is a dry vital gluten prepared by drying a water containing vital gluten while avoiding denaturation of protein.

* * * * *